United States Patent
Bahahlul et al.

(10) Patent No.: US 10,704,721 B2
(45) Date of Patent: Jul. 7, 2020

(54) COUPLER ASSEMBLY THAT COMPENSATES FOR MISALIGNMENT

(71) Applicant: A.R.I. Fluid Control Accessories Ltd., Kfar Charuv (IL)

(72) Inventors: Yoel Bahahlul, M.P. Jordan Valley (IL); Amir Davidesko, Binyamina Givat Ada (IL)

(73) Assignee: A.R.I. Fluid Control Accessories Ltd., Kfar Charuv (IL)

( * ) Notice: Subject to any disclaimer, the term of this patent is extended or adjusted under 35 U.S.C. 154(b) by 210 days.

(21) Appl. No.: 15/724,280

(22) Filed: Oct. 4, 2017

(65) Prior Publication Data

US 2018/0106407 A1    Apr. 19, 2018

Related U.S. Application Data

(60) Provisional application No. 62/407,620, filed on Oct. 13, 2016.

(51) Int. Cl.
| | | |
|---|---|---|
| *F16L 27/04* | (2006.01) | |
| *F16L 37/091* | (2006.01) | |
| *F16L 21/08* | (2006.01) | |
| *F16L 29/00* | (2006.01) | |
| *F16L 15/08* | (2006.01) | |

(52) U.S. Cl.
CPC ........... *F16L 37/0915* (2016.05); *F16L 15/08* (2013.01); *F16L 21/08* (2013.01); *F16L 27/04* (2013.01); *F16L 29/00* (2013.01); *F16L 2201/20* (2013.01)

(58) Field of Classification Search
CPC ......... F16L 27/023; F16L 27/02; F16L 27/00; F16L 27/04; F16L 27/047; F16L 39/04
USPC ......... 285/121.6, 121.7, 147.1, 146.1, 146.3, 285/146.2, 145.3, 261, 262, 263, 271
See application file for complete search history.

(56) References Cited

U.S. PATENT DOCUMENTS

| | | | | |
|---|---|---|---|---|
| 199,936 | A * | 2/1878 | Rowland ............... | F16L 17/035 285/111 |
| 746,360 | A * | 12/1903 | McAdams ............. | F16L 27/04 285/146.2 |
| 787,391 | A * | 4/1905 | Niederlander ........ | F16L 15/001 285/94 |
| 797,418 | A * | 8/1905 | Everson ................. | F16L 37/20 285/17 |
| 888,288 | A * | 5/1908 | Windemuller ........ | F16L 27/026 285/145.3 |
| 1,346,524 | A * | 7/1920 | Norwood ............... | F16L 27/073 285/271 |
| 2,111,200 | A * | 3/1938 | Amourelle ............. | F16J 15/54 285/146.2 |

(Continued)

*Primary Examiner* — Aaron M Dunwoody
(74) *Attorney, Agent, or Firm* — Dekel Patent Ltd.; David Klein

(57) ABSTRACT

A coupler assembly includes a fluid fitting formed with a first bore at one end thereof and a second bore at an opposite end thereof, both of the bores being formed with female threads. A fluid adaptor includes a neck portion ending in a terminal portion larger in diameter than the neck portion. A fitting ring secures the fluid adaptor to the fitting. The fitting ring includes a split ring that fits over the terminal portion. The fitting ring is formed with a male thread, which mates with the female thread of the second bore of the fitting. The fitting ring has a first inner portion with a flat annular shape and a second inner portion with a curved annular shape.

10 Claims, 4 Drawing Sheets

(56) References Cited

U.S. PATENT DOCUMENTS 4,842,059 A * 6/1989 Tomek .................... E21B 17/05
                                                    166/242.2
2008/0284165 A1* 11/2008 Chiang ................ F16L 21/002
                                                    285/261

* cited by examiner

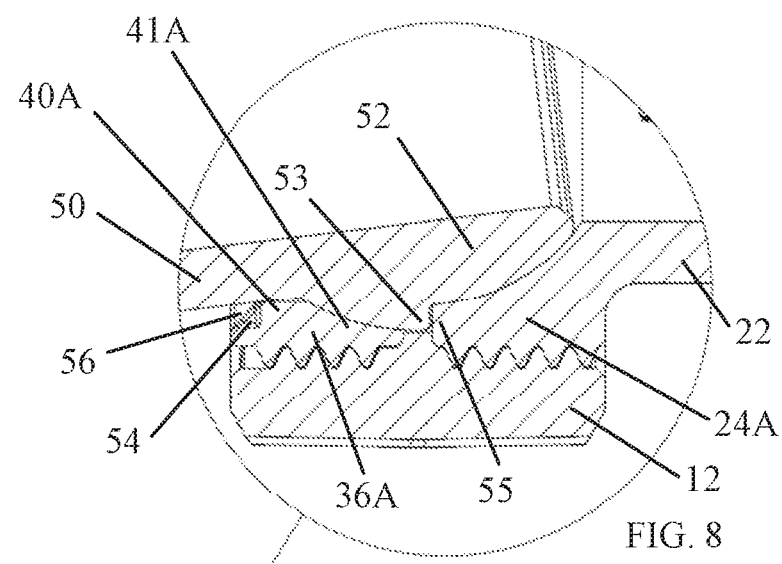
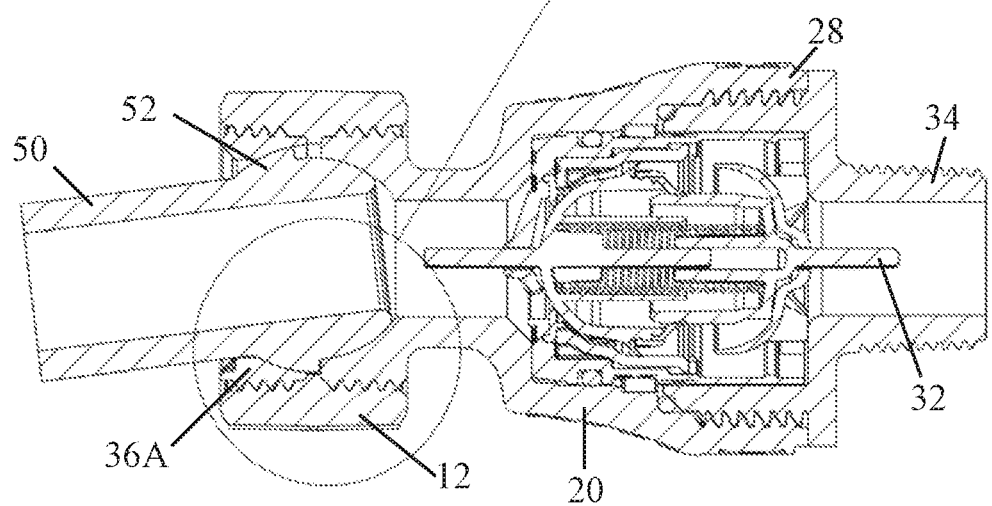
FIG. 8
FIG. 7

COUPLER ASSEMBLY THAT COMPENSATES FOR MISALIGNMENT

FIELD OF THE INVENTION

The present invention relates generally to fluid couplers, and particularly to a coupler assembly with a fitting ring that compensates for misalignment between fluid devices, such as pipes, meters, compression fittings, nuts and the like.

BACKGROUND OF THE INVENTION

Pipeline union couplers, pipeline union record fittings and other couplers associated with filters, pumps, valves, pipes, etc., have long been used in pipes, such as water lines, fuel lines, chemical supply lines, etc. Couplers typically clamp together two planar or frusto-conical annular surfaces with or without O-rings. The term "coupler" will be used to encompass all such couplers and fittings, such as union record fittings.

One of the problems in coupling pipes with other fluid fittings is that the pipe may be cantilevered with respect to the fluid fitting. The weight of the cantilevered pipe exerts a moment on the fitting and coupler and can tend to apply a bending moment on the coupler located at its root. There can also be angular and/or axial misalignment between the pipe and fitting or coupler.

SUMMARY OF THE INVENTION

The present invention seeks to provide an improved coupler assembly with a fitting ring that enables the coupling to bear high tension forces and compensates for misalignment (linear/angular) between fluid devices, such as pipes, meters, compression fittings, nuts and the like, as described more in detail hereinbelow.

There is thus provided in accordance with an embodiment of the present invention a coupler assembly including a fluid fitting formed with a first bore at one end thereof and a second bore at an opposite end thereof, both of the bores being formed with female threads, a fluid adaptor including a neck portion ending in a terminal portion larger in diameter than the neck portion, and a fitting ring configured to secure the fluid adaptor to the fitting, the fitting ring including a split ring that fits over the terminal portion, wherein the fitting ring is formed with a male thread, which mates with the female thread of the second bore of the fitting, and wherein the fitting ring has a first inner portion with a flat annular shape and a second inner portion with a curved annular shape.

In accordance with an embodiment of the present invention the curved annular shape permits the fluid adaptor to move relative to a longitudinal axis of the fitting.

In accordance with another embodiment of the present invention a pipe is secured by the fitting ring to the fitting and the curved annular shape permits the pipe to move relative to a longitudinal axis of the fluid adaptor.

The curved annular shape may be convexly rounded radially inwards or concavely rounded radially outwards.

In accordance with an embodiment of the present invention the fluid adaptor includes a receiver portion extending from the neck portion in a direction opposite to the terminal portion, the receiver portion being formed with female threads. A fluid device may be assembled in the receiver portion, such as but not limited to, an unmeasured flow reducer (UFR) housing mechanism. The fluid fitting may include an angled or in-line union record fitting.

BRIEF DESCRIPTION OF THE DRAWINGS

The present invention will be understood and appreciated more fully from the following detailed description taken in conjunction with the drawings in which:

FIG. 7 is a sectional illustration of the coupler assembly, taken along lines VII-VII in FIG. 5.

FIG. 8 is an enlarged illustration of a portion of FIG. 7, showing the fitting ring of the coupler assembly.

DETAILED DESCRIPTION OF EMBODIMENTS

Figure 1:
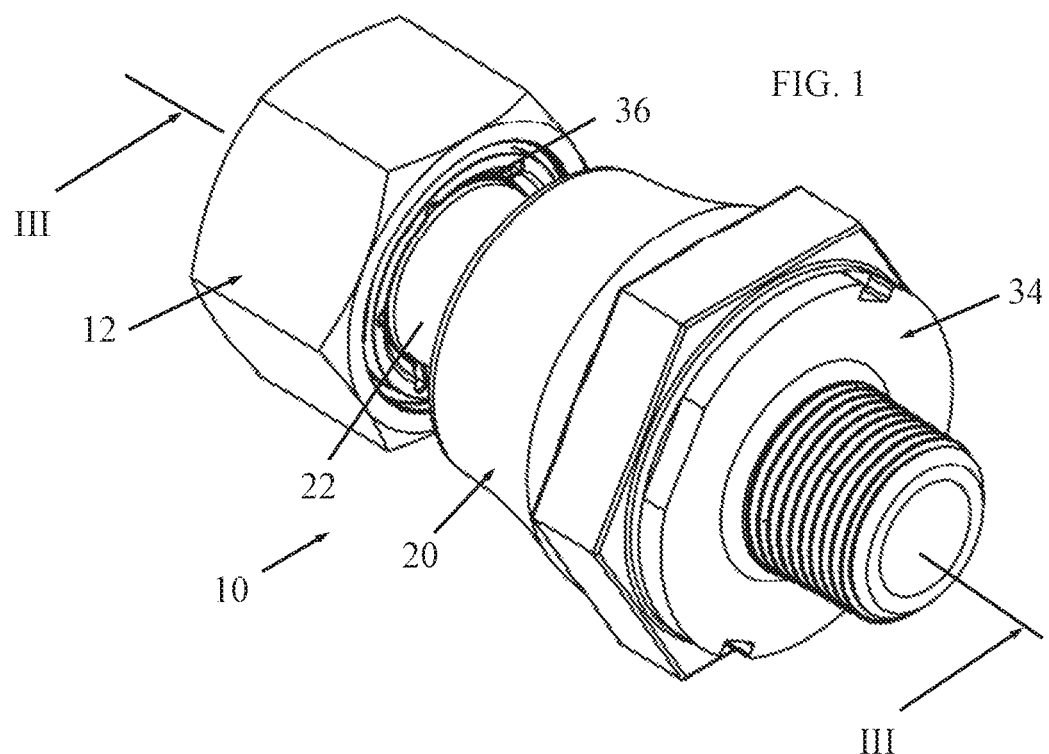
FIGS. 1 and 2 are simplified pictorial and exploded illustrations, respectively, of a coupler assembly, constructed and operative in accordance with a non-limiting embodiment of the present invention, used in one application for connecting a union record fitting, such as an in-line union record fitting, with an adapter.
Figure 2:
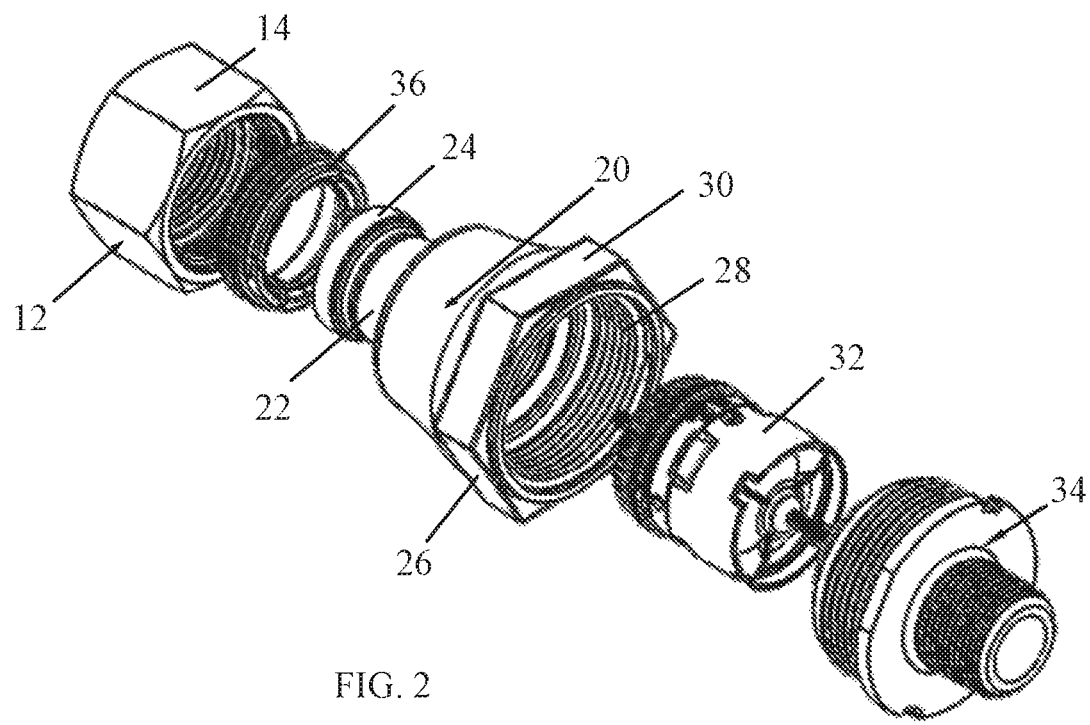
Figure 4:
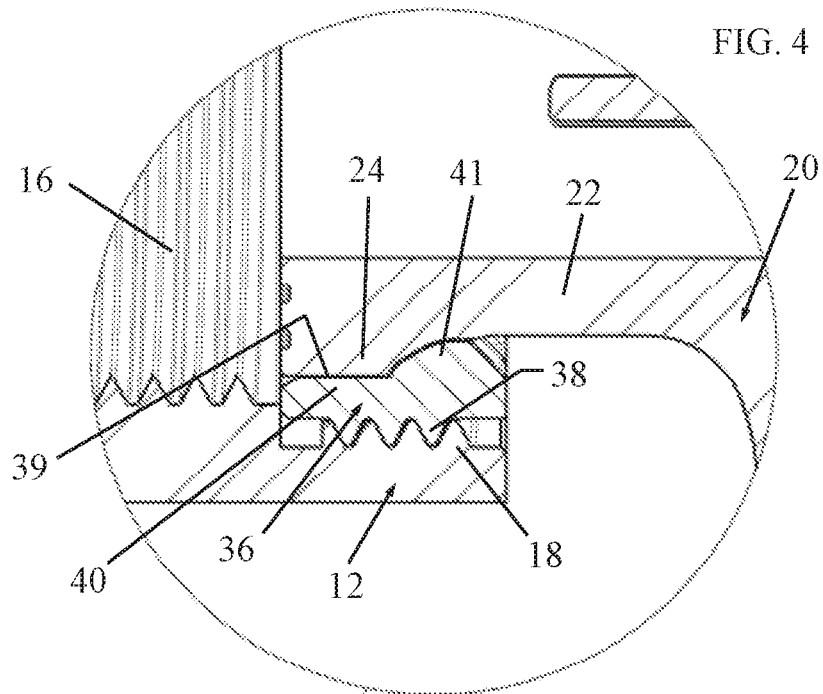
FIG. 4 is an enlarged illustration of a portion of FIG. 3, showing the fitting ring of the coupler assembly.
Figure 3:
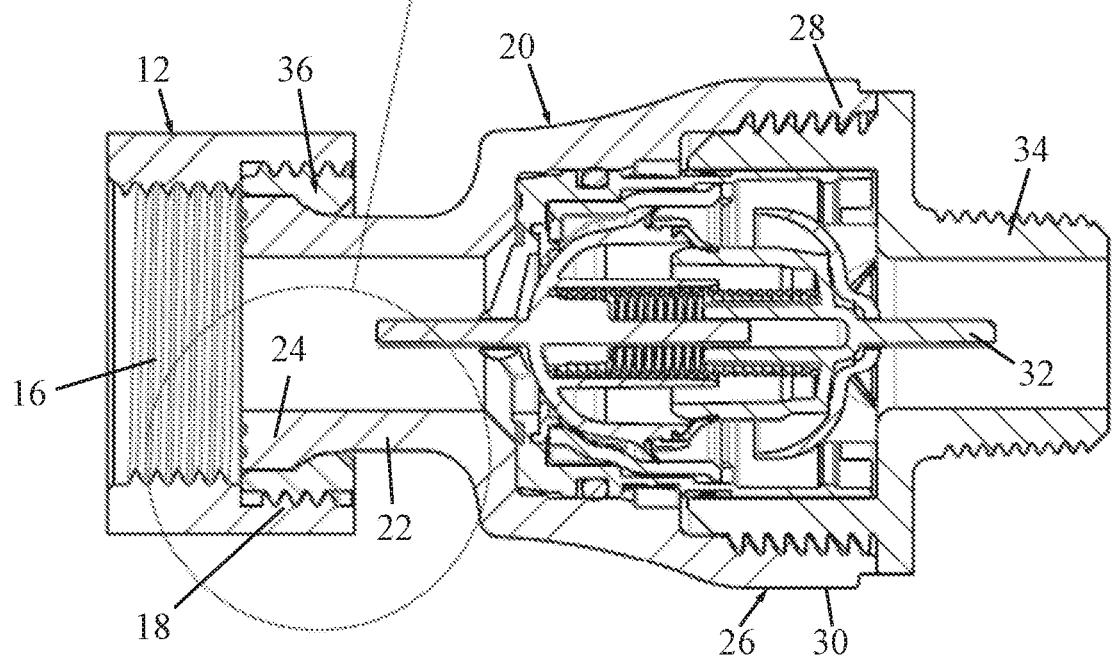
FIG. 3 is a sectional illustration of the coupler assembly, taken along lines III-III in FIG. 1.

Reference is now made to FIGS. 1-4, which illustrate a coupler assembly 10, constructed and operative in accordance with a non-limiting embodiment of the present invention.

Coupler assembly 10 includes a fluid fitting 12, such as a union record fitting (e.g., in-line). Fitting 12 may have hexagonal wrench flats 14 or other structure for tightening and fastening. Fitting 12 may be formed with a first bore 16 at one end thereof and a second bore 18 at an opposite end thereof. First and second bores 16 and 18 may each be a female NPT (National Pipe Thread—tapered) tapped bore. Second bore 18 may be a larger diameter than first bore 16. The bores may be tapped with the same threads, or alternatively, one bore may have coarser threads than the other bore. In the illustrated embodiment, first bore 16 is used for securing the fitting 12 to a pipe or other fluid device (not shown).

The coupler assembly 10 also includes a fluid adaptor 20, also referred to as an inlet member 20. Inlet member 20 includes a neck portion 22 ending in a terminal portion 24 larger in diameter than neck portion 22. Extending from neck portion 22, in a direction opposite to terminal portion 24, is a receiver portion 26 formed with female threads 28 (e.g., NPT) and having wrench flats 30.

Although the invention is not limited to this application, in the illustrated embodiment, an unmeasured flow reducer (UFR) mechanism 32 is assembled in receiver portion 26 of fluid adaptor 20. The UFR mechanism 32 is secured in adaptor 20 with an outlet member 34, which has male threads that mate with the female threads 28 of receiver portion 26.

In accordance with a non-limiting embodiment of the present invention, coupler assembly 10 includes a fitting ring 36, which is used to secure fluid adaptor 20 to fitting 12. Fitting ring 36 is a split ring that fits over the terminal portion 24 of neck portion 22 of adaptor 20 (as seen in FIGS.

3 and 4). The meaning of "ring" throughout the specification and claims is not necessarily a round object but also encompasses other shapes, such as hexagonal. "Split" means there is a gap formed in the ring, so that the ring is not continuously solid for 360°.

Fitting ring 36 is formed with a male thread 38, which mates with the female thread of second bore 18 of fitting 12. Fitting ring 36 has an aperture 39 sized to fit over terminal portion 24. Fitting ring 36 includes a first inner portion 40 with a flat annular shape and a second inner portion 41 with a curved annular shape (convexly rounded radially inwards). The curved annular shape is designed to minimize contact pressure and to permit misalignments between fitting 12 and the neck portion 22 of the fluid adaptor 20.

After fitting ring 36 has been assembled on adaptor 20, it is tightened in second bore 18, thereby securing adaptor 20 to fitting 12. The second inner portion 41 with its convex shape permits adaptor 20 to rotate about or otherwise move relative to the centerline of second bore 18 (the longitudinal axis of fitting 12). In this manner, fitting ring 36 compensates for misalignment between adaptor 20 and fitting 12. Such misalignment may occur due to the moment applied to adaptor 20 from the cantilevered fluid devices (e.g., UFR mechanism 32 and the flexible axis meter).

Fitting ring 36 may be made of any suitable material, such as but not limited to, plastic, metal and other materials. Fitting ring 36 enables easy assembly of adaptor 20 and fitting 12, both for in-line and angled union record fittings, even in unfriendly field conditions.

Figure 5:
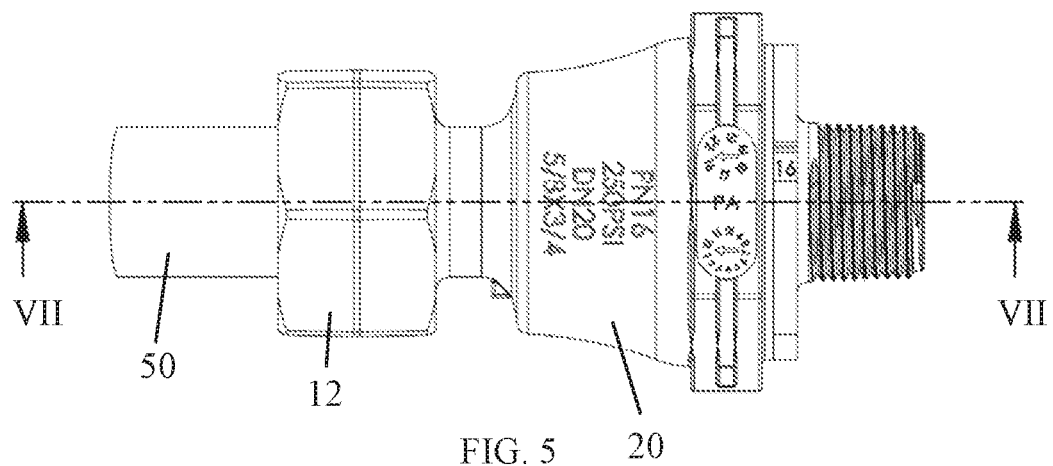
FIGS. 5 and 6 are simplified pictorial and end-view illustrations, respectively, of a coupler assembly, constructed and operative in accordance with another non-limiting embodiment of the present invention, used in one application for connecting an angled union record fitting with an adapter.
Figure 6:
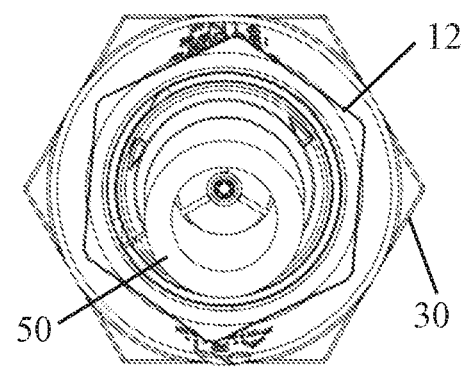

Reference is now made to FIGS. 5-8, which illustrate a coupler assembly, constructed and operative in accordance with another non-limiting embodiment of the present invention. The coupler assembly is similar to that of FIGS. 1-4, with like elements being designated by like numerals. The difference in the coupler assembly of FIGS. 5-8 is particularly useful for connecting an angled union record fitting with an adapter, as is now explained.

In this embodiment, the fluid adaptor 20 has a terminal portion 24A which has a bell-shaped mouth with male threads for mating with the female (internal) threads of fitting 12 (FIG. 8). The coupler assembly includes a fitting ring 36A used to secure fluid adaptor 20 to a pipe 50, which may also have a bell-shaped terminal end 52. Fitting ring 36A is a split external threaded nut (also called split external threaded ring). Fitting ring 36A fits over the terminal end 52 of pipe 50 (as seen in FIGS. 7 and 8). Similar to the previous embodiment, the female threads of fitting 12 screw together with the male threads of fitting ring 36A.

As seen in FIG. 8, fitting ring 36A includes a first inner portion 40A with a flat annular shape and a second inner portion 41A with a curved annular shape (concavely rounded radially outwards). The second inner portion 41A with its concave shape permits pipe 50 to rotate about or otherwise move relative to the centerline of the longitudinal axis of fitting 12 and the longitudinal axis of fluid adaptor 20. The curved annular shape is designed to minimize contact pressure and to permit misalignments between pipe 50 and fluid adaptor 20.

Fitting ring 36A is constructed like fitting 36 of the previous embodiment, except that fitting ring 36A is formed with a notch or recess 54 (FIG. 8). Pipe 50 is formed with a protrusion 56 (FIG. 8) that can be received in recess 54. When assembling pipe 50 with fluid adaptor 20, pipe 50 is tilted (angled) with respect to fluid adaptor 20 (this being an angled union record fitting). The protrusion 56 abutting inside recess 54 makes the installation of pipe 50 with fluid adaptor 20 at the correct desired angle easy with no need for special tools, even in harsh field environments.

Optionally, as seen in FIG. 8, terminal end 52 of pipe 50 may be formed with a flat abutment 53 that can about against an end face 55 of terminal portion 24A. This serves as a stop to ensure there is no excess tilt of pipe 50 with respect to fluid adaptor 20.

What is claimed is:

1. A coupler assembly comprising:
   a fluid fitting formed with a first bore at one end thereof and a second bore at an opposite end thereof, both of said bores being formed with female threads;
   a fluid adaptor comprising a neck portion ending in a terminal portion larger in diameter than said neck portion; and
   a fitting ring configured to secure said fluid adaptor to said fitting, said fitting ring comprising a split ring that fits over said terminal portion, wherein said fitting ring is formed with a male thread, which mates with the female thread of said second bore of said fitting, and wherein said fitting ring has a first inner portion with a flat annular shape and a second inner portion with a curved annular shape.

2. The coupler assembly according to claim 1, wherein said curved annular shape permits said fluid adaptor to move relative to a longitudinal axis of said fitting.

3. The coupler assembly according to claim 1, wherein a pipe is secured by said fitting ring to said fitting and said curved annular shape permits said pipe to move relative to a longitudinal axis of said fluid adaptor.

4. The coupler assembly according to claim 1, wherein said curved annular shape is convexly rounded radially inwards.

5. The coupler assembly according to claim 1, wherein said curved annular shape is concavely rounded radially outwards.

6. The coupler assembly according to claim 1, wherein said fluid adaptor comprises a receiver portion extending from said neck portion in a direction opposite to said terminal portion, said receiver portion being formed with female threads.

7. The coupler assembly according to claim 6, further comprising a fluid device assembled in said receiver portion.

8. The coupler assembly according to claim 7, wherein said fluid device comprises an unmeasured flow reducer (UFR) mechanism.

9. The coupler assembly according to claim 1, wherein said fluid fitting comprises an angled or in-line union record fitting.

10. The coupler assembly according to claim 1, wherein said terminal portion is axially outwards of said neck portion.

* * * * *